(12) United States Patent
Brunner et al.

(10) Patent No.: US 10,458,520 B2
(45) Date of Patent: Oct. 29, 2019

(54) DIRECTION CONTROLLED GEARBOX FOR APPLIANCE

(71) Applicant: SHARKNINJA OPERATING LLC, Needham, MA (US)

(72) Inventors: Charles Stewart Brunner, North Reading, MA (US); Ross Douglas Arriens, San Francisco, CA (US); Maxwell Russell Wood-Lee, Providence, RI (US); Steven Toddes, Cockeysville, MD (US)

(73) Assignee: SHARKNINJA OPERATING LLC, Needham, MA (US)

( * ) Notice: Subject to any disclaimer, the term of this patent is extended or adjusted under 35 U.S.C. 154(b) by 0 days.

(21) Appl. No.: 15/825,720

(22) Filed: Nov. 29, 2017

(65) Prior Publication Data

US 2018/0149238 A1 May 31, 2018

Related U.S. Application Data

(60) Provisional application No. 62/427,237, filed on Nov. 29, 2016.

(51) Int. Cl.
| | |
|---|---|
| *F16H 3/00* | (2006.01) |
| *A47J 43/08* | (2006.01) |
| *F16H 3/66* | (2006.01) |
| *F16H 37/08* | (2006.01) |

(52) U.S. Cl.
CPC ............ *F16H 3/005* (2013.01); *A47J 43/085* (2013.01); *A47J 43/087* (2013.01); *F16H 3/66* (2013.01); *F16H 37/0813* (2013.01); *F16H 2200/0034* (2013.01); *F16H 2200/2007* (2013.01); *F16H 2200/2035* (2013.01);
(Continued)

(58) Field of Classification Search
None
See application file for complete search history.

(56) References Cited

U.S. PATENT DOCUMENTS

| | | |
|---|---|---|
| 3,196,752 A | 7/1965 | Wahlstrom et al. |
| 3,711,065 A | 1/1973 | Lawrence |
| 4,141,259 A | 2/1979 | Appleberry |

(Continued)

FOREIGN PATENT DOCUMENTS

| | | |
|---|---|---|
| CN | 101731960 A | 6/2010 |
| EP | 2457479 A1 | 5/2012 |
| EP | 2471425 A1 | 7/2012 |

OTHER PUBLICATIONS

PCT ISR Written Opinion; International Application No. PCT/US2017/063634; International Filing Date: Nov. 29, 2017; dated Feb. 27, 2018; pp. 1-7.

(Continued)

*Primary Examiner* — Justin Holmes
(74) *Attorney, Agent, or Firm* — Cantor Colburn LLP (57) ABSTRACT

A drive system for use in a piece of an appliance includes a drive shaft and a first rotary coupling and a second rotary coupling. When the drive shaft is rotated in a first direction, the first rotary coupling and the second rotary coupling rotate about an axis of the drive shaft at a same speed. When the drive shaft is rotated in a second opposite direction, the first rotary coupling and the second rotary coupling rotate about the axis of said drive shaft at different speeds.

15 Claims, 5 Drawing Sheets

(52) U.S. Cl.
CPC ........... *F16H 2200/2069* (2013.01); *F16H 2200/2084* (2013.01); *F16H 2200/2097* (2013.01)

(56) References Cited

U.S. PATENT DOCUMENTS

| | | | |
|---|---|---|---|
| 5,333,517 | A | 8/1994 | Bryson et al. |
| 5,531,651 | A | 7/1996 | Yang |
| 6,164,812 | A | 12/2000 | Brezovnik et al. |
| 6,527,671 | B2 | 3/2003 | Paalasmaa et al. |
| 6,640,693 | B2 | 11/2003 | Brezovnik et al. |
| 6,719,670 | B1 | 4/2004 | Wu et al. |
| 8,257,220 | B2 | 9/2012 | Yang |
| 8,353,228 | B2 | 1/2013 | Yang |
| 8,382,627 | B2 | 2/2013 | Cheung et al. |
| 8,418,585 | B2 | 4/2013 | Yang |
| 8,506,437 | B2 | 8/2013 | Cheung et al. |
| 8,661,943 | B2 | 3/2014 | Cheung et al. |
| 8,931,401 | B2 | 1/2015 | Cheung |
| 9,211,028 | B2 | 12/2015 | Gheung et al. |
| 9,429,214 | B2 | 8/2016 | Kim |
| 2011/0034283 | A1 | 2/2011 | Tsai et al. |
| 2011/0185848 | A1 | 8/2011 | Yang |
| 2012/0071293 | A1* | 3/2012 | Cheung .............. A47J 43/085 475/331 |
| 2013/0324347 | A1 | 12/2013 | Lewton et al. |
| 2014/0007723 | A1 | 1/2014 | Takahashi et al. |
| 2014/0027233 | A1 | 1/2014 | Baeumler et al. |
| 2014/0162829 | A1 | 6/2014 | Yang |
| 2014/0300078 | A1 | 10/2014 | Ruffieux et al. |
| 2015/0009776 | A1 | 1/2015 | Cheung et al. |
| 2015/0276020 | A1 | 10/2015 | Yoon et al. |
| 2015/0300472 | A1 | 10/2015 | Park et al. |
| 2015/0345595 | A1 | 12/2015 | Lewton et al. |
| 2015/0354672 | A1 | 12/2015 | Bouwer et al. |
| 2016/0000266 | A1 | 1/2016 | Potter et al. |
| 2016/0249772 | A1 | 9/2016 | Jays et al. |

OTHER PUBLICATIONS

PCT Notification of Transmittal of The International Search Report; International Application No. PCT/US2017/063634; International Filing Date: Nov. 29, 2017; dated Feb. 27, 2018; pp. 1-7.

* cited by examiner

DIRECTION CONTROLLED GEARBOX FOR APPLIANCE

CROSS-REFERENCE TO RELATED APPLICATIONS

This application claims the benefit of U.S. Provisional Application Ser. No. 62/427,237 filed Nov. 29, 2016, which is incorporated herein by reference in its entirety.

BACKGROUND

This application is directed to an appliance, and more particularly, to a drive system configured to operate an appliance.

A variety of pieces of home equipment include a motor configured to drive a component of an appliance about an axis of rotation. An example of one such appliance is a blender, commonly used to process a plurality of different food products, including liquids, solids, semi-solids, gels and the like. It is well-known that blenders are useful devices for blending, cutting, and dicing food products in a wide variety of commercial settings, including home kitchen use, professional restaurant or food services use, and large-scale industrial use. They offer a convenient alternative to chopping or dicing by hand, and often come with a range of operational settings and modes adapted to provide specific types or amounts of food processing, e.g., as catered to particular food products.

SUMMARY

According to one embodiment, a drive assembly for use in a piece of home equipment includes a drive shaft and a first rotary coupling and a second rotary coupling. When said drive shaft is rotated in a first direction, said first rotary coupling and said second rotary coupling rotate about an axis of said drive shaft at a same speed. When said drive shaft is rotated in a second opposite direction, said first rotary coupling and said second rotary coupling rotate about said axis of said drive shaft at different speeds.

In addition to one or more of the features described above, or as an alternative, in further embodiments said first rotary coupling rotates about said axis of said drive shaft at a first speed and said second rotary coupling rotates about said axis of said drive shaft at a second speed, said first speed being slower than said second speed.

In addition to one or more of the features described above, or as an alternative, in further embodiments said first rotary coupling and said second rotary coupling rotate about said axis of said drive shaft in said second direction when said drive shaft is rotated in both said first direction and said second direction.

In addition to one or more of the features described above, or as an alternative, in further embodiments comprising a motorized power source associated with said drive shaft, the motorized power source being operable to rotate said drive shaft about said axis in said first direction and said second direction.

In addition to one or more of the features described above, or as an alternative, in further embodiments comprising: an input carrier, an output carrier associated with said first rotary coupling, a first drive assembly associated with said input carrier, a second drive assembly associated with said second rotary coupling and said output carrier; and a mechanism configured to transfer motion between said first drive assembly and said second drive assembly.

In addition to one or more of the features described above, or as an alternative, in further embodiments comprising a first one-way mechanism operable to selectively couple said drive shaft to a portion of said second drive assembly and a second one-way mechanism operable to selectively couple said portion of said second drive assembly to said output carrier In addition to one or more of the features described above, or as an alternative, in further embodiments wherein when said drive shaft is rotated in said first direction said second one way mechanism couples said portion of said second drive assembly to said output carrier.

In addition to one or more of the features described above, or as an alternative, in further embodiments when said drive shaft is rotated in said second direction said first one way mechanism couples said drive shaft to said portion of said second drive assembly.

In addition to one or more of the features described above, or as an alternative, in further embodiments said first drive assembly includes a first sun gear mounted for rotation with said drive shaft and at least one first planetary gear engaged with said first sun gear, said at least one first planetary gear being pinned to said input carrier.

In addition to one or more of the features described above, or as an alternative, in further embodiments said second drive assembly includes a second sun gear mounted concentrically with said drive shaft and at least one second planetary gear engaged with said second sun gear, said at least one second planetary gear being pinned to said output carrier.

In addition to one or more of the features described above, or as an alternative, in further embodiments said mechanism configured to transfer motion between said first drive assembly and said second drive assembly includes a compound ring gear.

In addition to one or more of the features described above, or as an alternative, in further embodiments said second rotary coupling is coupled to said second sun gear.

In addition to one or more of the features described above, or as an alternative, in further embodiments when said drive shaft is rotated about said axis of rotation in a first direction, a gear ratio of said drive shaft to said first rotary coupling and said second rotary coupling is between about 3:1 and about 10:1.

In addition to one or more of the features described above, or as an alternative, in further embodiments when said drive shaft is rotated about said axis of rotation in a second direction, a gear ratio of said drive shaft to said first rotary coupling is between about 20:1 and about 200:1.

In addition to one or more of the features described above, or as an alternative, in further embodiments when said drive shaft is rotated about said axis of rotation in a second direction, a gear ratio of said drive shaft to said second rotary coupling is about 1:1.

According to another embodiment, a drive system for use in a piece of an appliance includes a drive shaft rotatable about an axis in a first direction and a second direction opposite said first direction, and a first rotary coupling and a second rotary coupling. Said first rotary coupling and said second rotary coupling are configured to rotate about said axis of said drive shaft in said first direction when said drive shaft rotates in said first direction and when said drive shaft rotates in said second direction.

BRIEF DESCRIPTION OF THE FIGURES

The accompanying drawings incorporated in and forming a part of the specification embodies several aspects of the present invention and, together with the description, serves to explain the principles of the invention. In the drawings.

The detailed description explains embodiments of the invention, together with advantages and features, by way of example with reference to the drawings.

DETAILED DESCRIPTION

Figure 1:
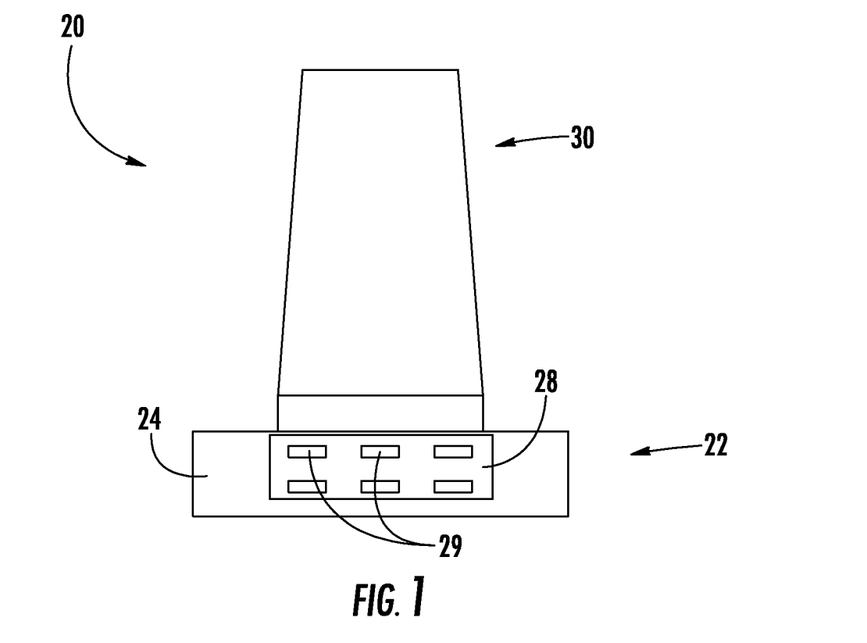
FIG. 1 is a front view of an example of an appliance.
Figure 2:
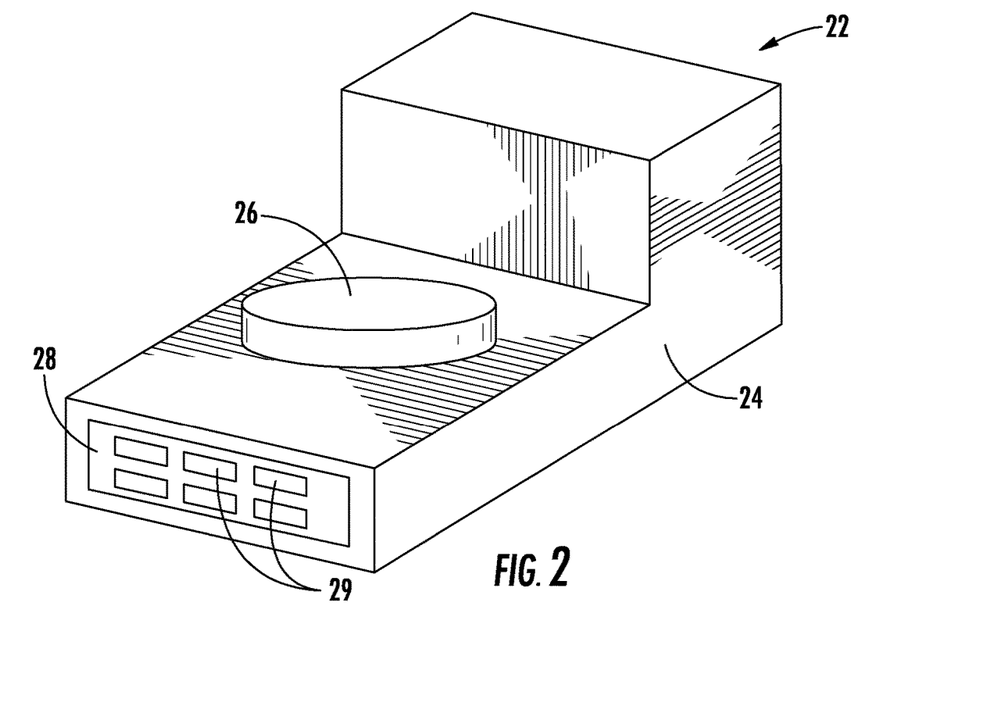
FIG. 2 is a perspective view of an example of a base of the appliance of FIG. 1 system.

Referring now to FIGS. 1 and 2, an example of an appliance 20 is illustrated in more detail. As shown, the appliance 20 is a system for processing food and can be adapted to perform any food processing or blending operation including as non-limiting examples, dicing, chopping, cutting, slicing, mixing, blending, stirring, crushing, or the like. The illustrated system for processing food 20 includes a base 22 having a body or housing 24 within which a motorized unit (not shown) and at least one controller (not shown) are located. The base 22 includes at least one rotary coupling 26 (see FIG. 3) for example, driven by the motorized unit within the body 24. The base 22 additionally includes a control panel or user interface 28 including one or more buttons or other input devices 29 for turning the motorized unit on and off and for selecting various modes of operation, such as pulsing, blending, or continuous food processing for example.

A plurality of interchangeable attachments 30 varying in size and/or functionality may be configured for use with the base 22. For example, in FIG. 1, the attachment 30 connected to the food processor base 22 is a generally hollow container. Each attachment 30 is configured to engage a portion of the at least one rotary coupling 26 when coupled to the base 22 for the processing of food products located within an interior of the attachment 30. This will become more apparent in subsequent FIGS. and discussion.

Figure 3:
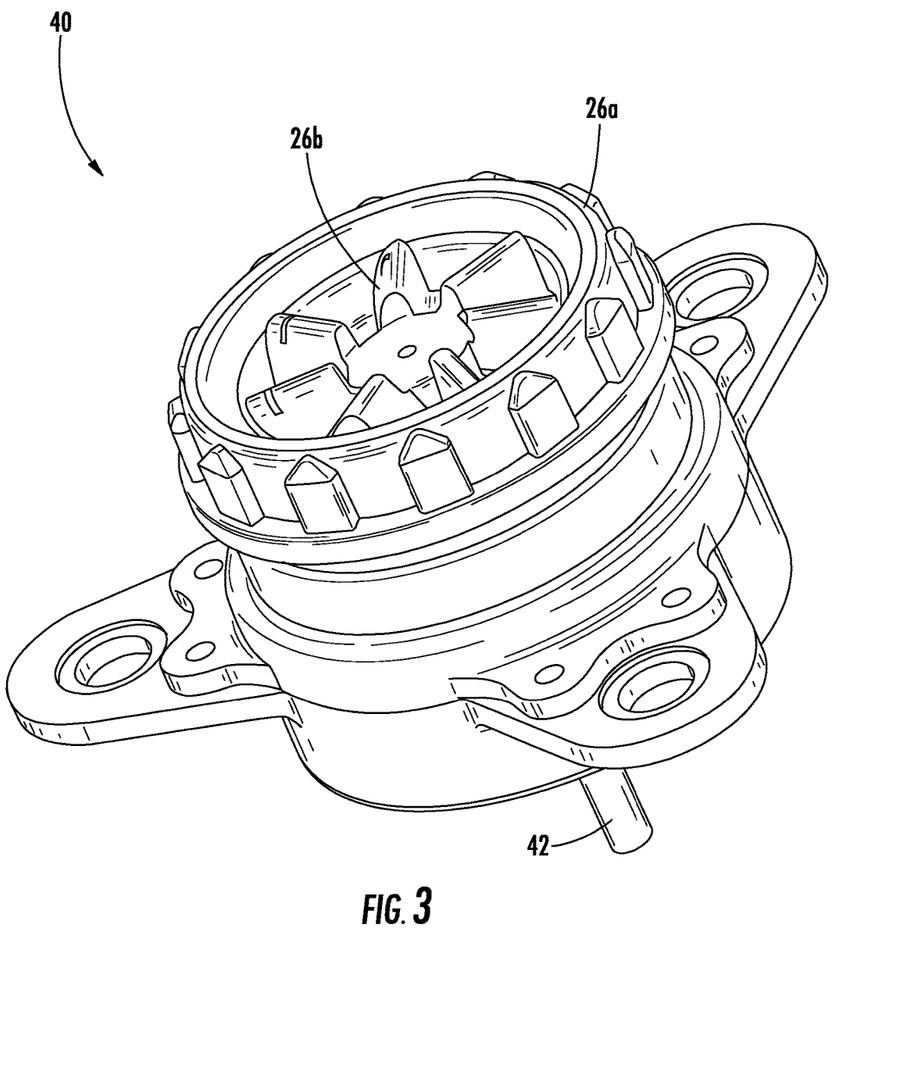
FIG. 3 is a perspective view of a rotary coupling of an appliance according to an embodiment.
Figure 4:
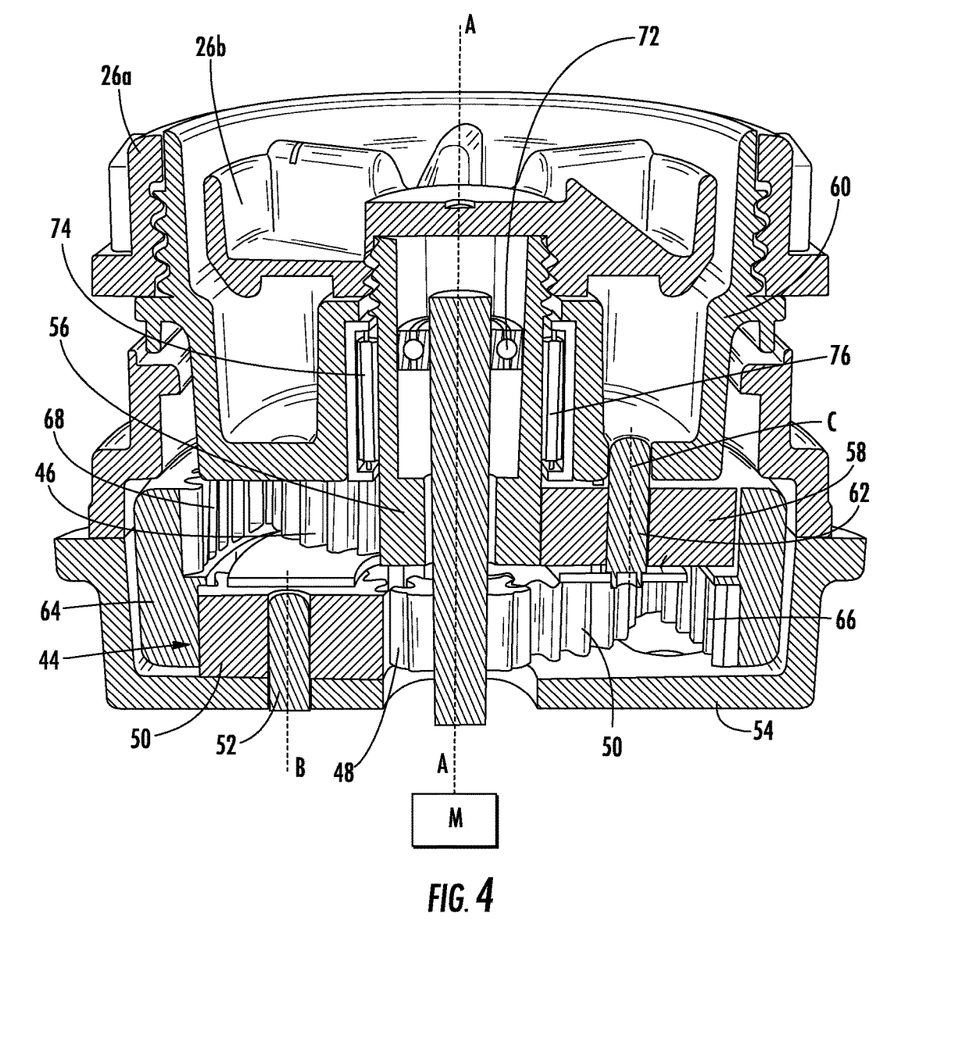
FIG. 4 is a cross-sectional view of a gearbox configured for use in an appliance according to an embodiment.
Figure 5:
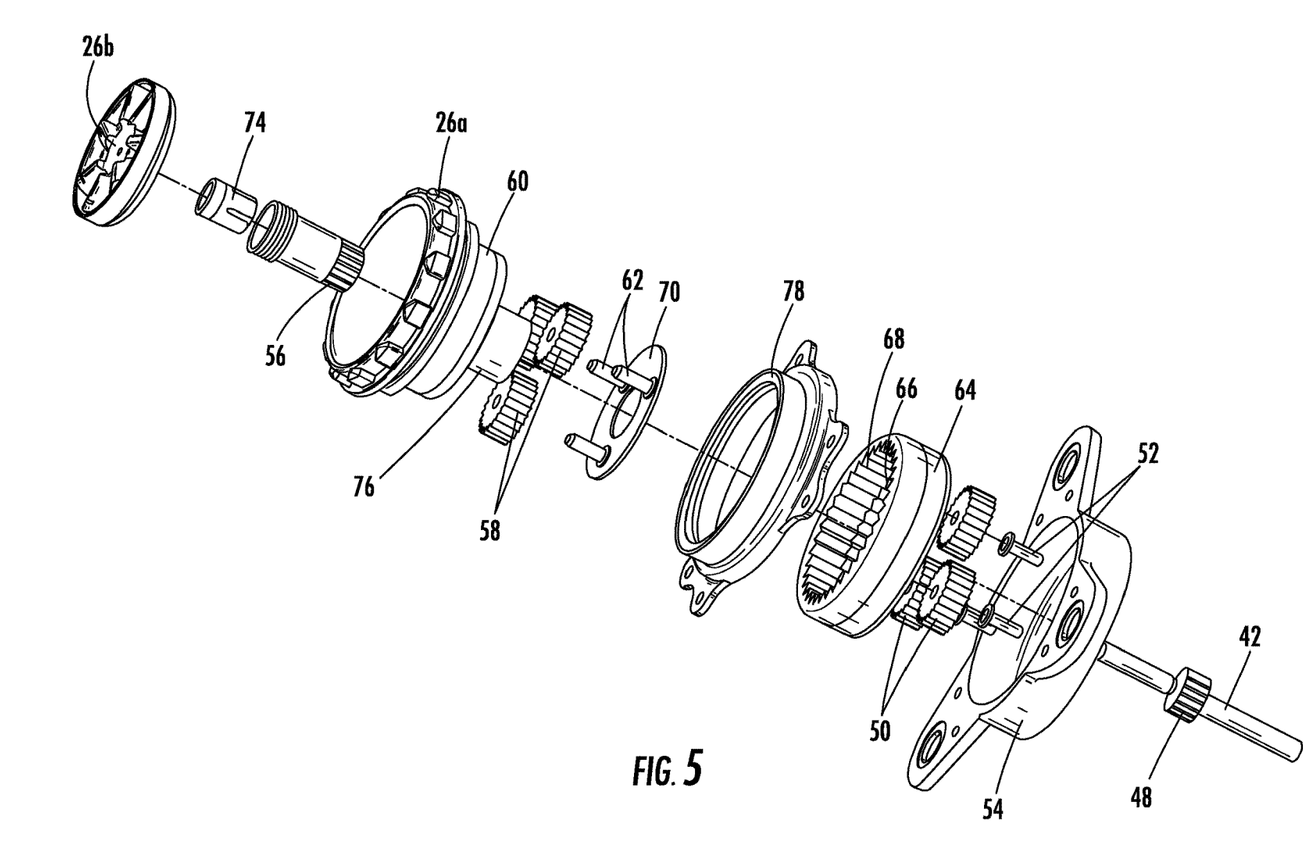
FIG. 5 is an exploded view of a gearbox configured for use in an appliance according to an embodiment.

Referring now to FIGS. 3-5, a drive system 40 configured to drive rotation of at least one rotary component of the appliance 20 about a central axis A is illustrated in more detail. Although the appliance 20 illustrated and described herein is a system for processing food, any other type of home appliance including a motor and a drive train or system 40 is contemplated herein. Examples of other types of home appliances include, but are not limited to home appliances, such as blenders, food processors, mixers, roasters, vacuums, carpet cleaners, steam cleaners, can openers, dishwashers, home maintenance tools, such as lawn mowers, leaf blowers, pressure washers, snow blowers, and home power tools, such as drills, saws, nail guns, and sanders for example.

The drive system 40 includes a centrally located drive shaft 42 rotatable about axis A in both a first direction and a second, opposite direction. Rotation of the drive shaft 42 is controlled by a power source, illustrated schematically at M (FIG. 4). The power source M may be directly or indirectly connected to the drive shaft 42, and may be generally aligned with, or alternatively, may be offset from the axis A of the drive shaft 42. Although a motorized power source is most common, other types of power sources, such as a manually driven power system for example, are also within the scope of the disclosure. In addition, embodiments where the motorized power source is configured to pneumatically or hydraulically operate a portion of the drive system 40 are also within the scope of the disclosure.

The drive system 40 additionally includes a first drive assembly 44 and a second drive assembly 46. The first drive assembly 44 includes a first planetary gear system having a first primary or sun gear 48 arranged concentrically with and fixedly mounted to the center drive shaft 42 and at least one first planet or secondary gear 50 engaged with the first sun gear 48. In an embodiment, the first planet gears 50 are pinned or otherwise coupled, such as with pin 52 for example, to an adjacent input carrier 54. As the drive shaft 42 is rotated, the at least one first planet gear 50 is configured to rotate about its own axis B, such as defined by pin 52 for example, in a direction opposite the rotation of the center drive shaft 42. The second drive assembly 46 similarly includes a planetary gear system having a second sun gear 56 and at least one second planet gear 58 arranged in an intermeshing relationship therewith. The at least one second planet gear 58 is rotatably mounted to an output carrier 60, such as with a pin 62 for example.

A compound ring gear 64 is arranged concentrically about the first drive assembly 44 and the second drive assembly 46. The compound ring gear 64 includes a first set of teeth 66 operably coupled to the teeth of the at least one first planet gear 50 and a second set of teeth 68, disposed vertically above the first set of teeth 66, and operably coupled to the teeth of the at least one second planet gear 58. In an embodiment, the inner diameter defined by the first set of teeth 66 of the ring gear 64 is greater than the inner diameter defined by the second set of teeth 68 of the ring gear 64. However, embodiments where the inner diameter defined by the first set of teeth 66 of the ring gear 64 is smaller than or substantially equal to the inner diameter defined by the second set of teeth 68 of the ring gear 64 are also contemplated herein. In the illustrated, non-limiting embodiment, a support plate 70 is disposed vertically below the at least one second planet gear 58 to provide vertical support thereto and prevent engagement with the at least one first planet gear 50. However, other embodiments, such as where the at least one second planet gear 58 is supported by a flange extending from the ring gear 64 between the first and second sets of teeth 66, 68, or where the at least one second planet gear 58 is supported solely by the connection to the outlet carrier for example, are also contemplated herein.

Mounted concentrically with the drive shaft 42, between the drive shaft 42 and a portion of the second sun gear 56, is a bearing 72 and a first one way mechanism 74. Examples of a one way mechanism 74 include, but are not limited to, a sprag, an over running clutch, or a ratchet and pawl mechanism for example. Accordingly, the first one way mechanism 74 is configured to allow rotation of the drive shaft 42 about axis A relative to the second sun gear 56 in only one direction. Similarly, a second one way mechanism 76 is configured to selectively couple to the second sun gear 56. The second one way mechanism 76 allows rotation of the second sun gear 56 relative to the output carrier 60 in only one direction. In an embodiment, the first one way mechanism 74 is configured to allow relative rotation in a first direction, but not a second direction, and the second one way mechanism 76 is configured to allow relative rotation in a second direction, but not a first direction. Although the one-way mechanisms 74 and 76, are illustrated and described as being arranged generally concentric with the shaft 42, embodiments where the one-way mechanisms 74, 76 are mounted to an alternative portion of the first drive assembly 44 and second drive assembly 46, such as installed about the planets for example, are also contemplated herein. In addition, other suitable alternative configurations exist where a change in motor direction operates the first drive assembly 44 and the second drive assembly 46 in different manners.

The drive system 40 includes a first rotary coupling 26a and a second rotary coupling 26b. In the illustrated, non-limiting embodiment, the first rotary coupling 26a is generally complementary to an adjacent portion of housing 78 configured to cooperate with the input carrier 54 to enclose the first and second drive assemblies 44, 46. The second rotary coupling 26b is located within a hollow interior of the first rotary coupling 26a. However, a drive system 40 having the first rotary coupling 26a and second rotary coupling 26b arranged in another configuration is also within the scope of the disclosure. Each of the couplings 26a, 26b may include unique features, such as grooves or teeth for example, configured to associate the coupling to one of the plurality of attachments 30 configured for use with the system for processing food 20. In an embodiment, the first rotary coupling 26a is mounted to the output carrier 60 and the second rotary coupling 26b is affixed to the second sun gear 56. Embodiments where the first rotary coupling 26a is connected to the second sun gear 56 and the second rotary coupling 26b is connected to the output carrier 60 are also contemplated herein. In addition, although the first and second rotary couplings 26a, 26b are shown as being connected to the output carrier 60 and the second sun gear 56, respectively, via threaded engagement, any mechanism for forming a fixed or removable connection is contemplated herein.

When the drive shaft 42 of the drive system 40 is operated in a first direction, such as counterclockwise for example, the first one way mechanism 74 allows the drive shaft 42 to rotate relative to the second sun gear 56. The second one way mechanism 76, however, restricts rotation of the second sun gear 56 relative to the output carrier 60. As the drive shaft 42 rotates in the first direction, the first sun gear 48 engages and drives a corresponding rotation of the at least one first planet gear 50 about axis B. Because the at least one first planet gear 50 is pinned, and therefore prevented from rotating about the axis A of the first sun gear 48, the rotation of the at least one first planet gear 50 about axis B will drive a corresponding rotation of the compound ring gear 64. Because the second sun gear 56 is rotationally fixed relative to the output carrier 60, the second sun gear 56 is rotationally fixed relative to the at least one second planet gear 58. Accordingly, the rotation of the ring gear 64 drives rotation of the second drive assembly 46 and the output carrier 60 as a unitary body about the axis of rotation A of the drive shaft 42. During this rotation, the engagement between the at least one second planet gear 58 and the second set of teeth 68 of the ring gear 64 remains constant.

Because the second sun gear 56 and the output carrier 60 are rotationally fixed relative to one another, the second sun gear 56 and the at least one second planet gear 58 rotated at the same speed about the axis of rotation A of the drive shaft 42. Accordingly, the first rotary coupling 26a, associated with the output carrier 60, and the second rotary coupling 26b associated with the second sun gear 56 are driven with the same gear ratio. In the illustrated, non-limiting embodiment, the gear ratio between the motor M and the first rotary coupling 26a and the second rotary coupling 26b when the drive shaft 42 is driven in a first direction is between about 3:1 and about 10:1, such as about 4:1 for example. However, other gear ratios are also contemplated within the scope of the disclosure. Further, when the drive shaft 42 is rotated about axis A in the first direction, both of the first and second rotary couplings 26a, 26b are configured to rotate in the second, opposite direction.

When the drive shaft 42 of the system 40 is rotated in a second opposite direction, such as clockwise for example, the first one way mechanism 74 rotatably couples the drive shaft 42 and the second sun gear 56, and the second one way mechanism 76 allows the second sun gear 56 to rotate freely relative to the output carrier 60. As the drive shaft 42 rotates in the second direction, the first planet gear 48 engages and drives a corresponding rotation of the at least one first planet gear 50. Because the at least one first planet gear 50 is pinned to the input carrier 54, and therefore prevented from rotating about the axis A of the first sun gear 48, the rotation of the at least one first planet gear 50 will drive a corresponding rotation of the compound ring gear 64. At the same time, the rotation of the drive shaft 42 in the second direction causes the second sun gear 56 to drive a corresponding rotation of the at least one second planet gear 58 about its respective axis C. The engagement of the at least one second planet gear 58 as it rotates about its axis C with the second set of teeth 68 of the ring gear 64 as the ring gear 64 rotates about the axis A of the drive shaft 42 causes the at least one second planet gear 58 to rotate about the second sun gear 56.

Because the output carrier 60 is coupled to the at least one second planet gear 58, the output carrier 60 is configured to rotate about the axis A of the drive shaft 42. In such embodiments, the first rotary coupling 26a and the second rotary coupling are driven at different speeds. In an embodiment, the gear ratio between the motor M and the first rotary coupling 26a when the drive shaft 42 is driven in a second direction is between about 20:1 and about 200:1, such as about 53:1 for example, and the gear ratio between the motor M and the second rotary coupling 26b when the drive shaft 42 is driven in a second direction is 1:1. Further, when the drive shaft 42 is rotated about axis A in the second direction, both of the first and second rotary couplings 26a, 26b are configured to rotate in the same second direction. Consequently, in an embodiment, the first and second rotary couplings 26a, 26b are configured to rotate in the same second direction, regardless of the direction of rotation of the drive shaft 42 about axis A. However, in other embodiments, depending on the selected gear rations, the first drive assembly 44 and the second drive assembly 46, and the couplers 26a, 26b coupled thereto, may rotate in opposite directions.

The attachments 30 of the system 20 are configured to connect to at least one of the first rotary coupling 26a and the second rotary coupling 26b such that the rotation of the couplings 26a, b drives operation of the attachment 30 and the system 20. Through use of the drive system 40, various speeds of the first and second rotary couplings 26a, 26b may be achieved by controlling the direction of rotation of the drive shaft 42 of the drive system 40.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments of this invention are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A drive system for use in a piece of an appliance, comprising:
    a drive shaft; and
    a first rotary coupling and a second rotary coupling, wherein when said drive shaft is rotated in a first direction, said first rotary coupling and said second rotary coupling rotate about an axis of said drive shaft at a same speed and when said drive shaft is rotated in a second opposite direction, said first rotary coupling and said second rotary coupling rotate about said axis of said drive shaft at different speeds.

2. The drive system according to claim 1, wherein said first rotary coupling rotates about said axis of said drive shaft at a first speed and said second rotary coupling rotates about said axis of said drive shaft at a second speed, said first speed being slower than said second speed.

3. The drive system according to claim 1, wherein said first rotary coupling and said second rotary coupling rotate about said axis of said drive shaft in said second direction when said drive shaft is rotated in both said first direction and said second direction.

4. The drive system according to claim 1, further comprising a motorized power source associated with said drive shaft, the motorized power source being operable to rotate said drive shaft about said axis in said first direction and said second direction.

5. The drive system according to claim 1, further comprising
    an input carrier;
    an output carrier associated with said first rotary coupling;
    a first drive assembly associated with said input carrier;
    a second drive assembly associated with said second rotary coupling and said output carrier; and
    a mechanism configured to transfer motion between said first drive assembly and said second drive assembly.

6. The drive system according to claim 5, further comprising
    a first one-way mechanism operable to selectively couple said drive shaft to a portion of said second drive assembly; and
    a second one-way mechanism operable to selectively couple said portion of said second drive assembly to said output carrier.

7. The drive system according to claim 6, wherein when said drive shaft is rotated in said first direction said second one way mechanism couples said portion of said second drive assembly to said output carrier.

8. The drive system according to claim 6, wherein when said drive shaft is rotated in said second direction said first one way mechanism couples said drive shaft to said portion of said second drive assembly.

9. The drive system according to claim 5, wherein said first drive assembly includes:
    a first sun gear mounted for rotation with said drive shaft; and
    at least one first planetary gear engaged with said first sun gear, said at least one first planetary gear being pinned to said input carrier.

10. The drive system according to claim 9, wherein said second drive assembly includes:
    a second sun gear mounted concentrically with said drive shaft; and
    at least one second planetary gear engaged with said second sun gear, said at least one second planetary gear being pinned to said output carrier.

11. The drive system according to claim 9, wherein said mechanism configured to transfer motion between said first drive assembly and said second drive assembly includes a compound ring gear.

12. The drive system according to claim 9, wherein said second rotary coupling is coupled to said second sun gear.

13. The drive system according to claim 1, wherein when said drive shaft is rotated about said axis of rotation in a first direction, a gear ratio of said drive shaft to said first rotary coupling and said second rotary coupling is between about 3:1 and about 10:1.

14. The drive system according to claim 1, wherein when said drive shaft is rotated about said axis of rotation in a second direction, a gear ratio of said drive shaft to said first rotary coupling is about 20:1 and about 200:1.

15. The drive system according to claim 1, wherein when said drive shaft is rotated about said axis of rotation in a second direction, a gear ratio of said drive shaft to said second rotary coupling is about 1:1.

* * * * *